United States Patent [19]
Cloud

[11] 3,896,687
[45] July 29, 1975

[54] MAGNETIC TIRE CHAIN INSTALLING DEVICE

[76] Inventor: Sidney C. Cloud, Rt. 1, Box 1834, Shingle Springs, Calif. 95682

[22] Filed: Nov. 26, 1973

[21] Appl. No.: 418,837

[52] U.S. Cl. .................................................. 81/15.8
[51] Int. Cl. ............................................ B60c 27/06
[58] Field of Search......... 152/216, 213 R, 214, 215; 335/285; 248/206 A; 81/15.8

[56] References Cited
UNITED STATES PATENTS

| | | | |
|---|---|---|---|
| 1,426,268 | 8/1922 | Flugel | 81/15.8 |
| 2,506,400 | 5/1950 | Wietz | 335/285 X |
| 2,920,516 | 1/1960 | Moore | 81/15.8 |
| 3,042,095 | 7/1962 | Knowles | 81/15.8 X |

*Primary Examiner*—Allen N. Knowles
*Assistant Examiner*—Hadd S. Lane
*Attorney, Agent, or Firm*—Blair & Brown

[57] ABSTRACT

A magnetic tire chain installing device is provided and includes a magnetic block adapted to selectively engage the rim of a vehicle wheel and includes a strap having a hook thereon for engaging a portion of a chain that is to be installed or mounted on the vehicle wheel. The device permits the tire chain to be installed, and then the device is removed so that the vehicle can be operated or driven with the tire chains thereon. For example during adverse driving conditions, such as when there is snow, ice, mud and the like.

4 Claims, 5 Drawing Figures

PATENTED JUL 29 1975  3,896,687
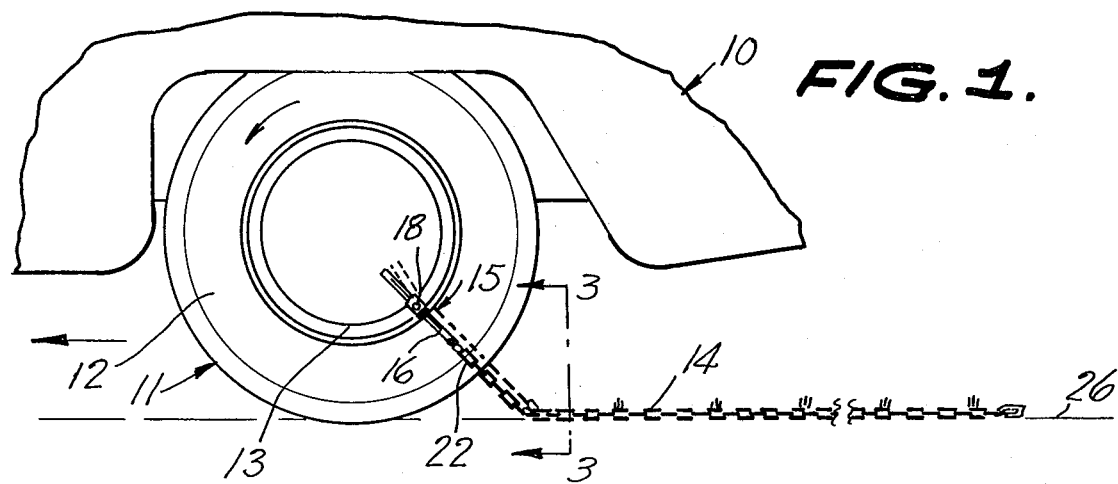
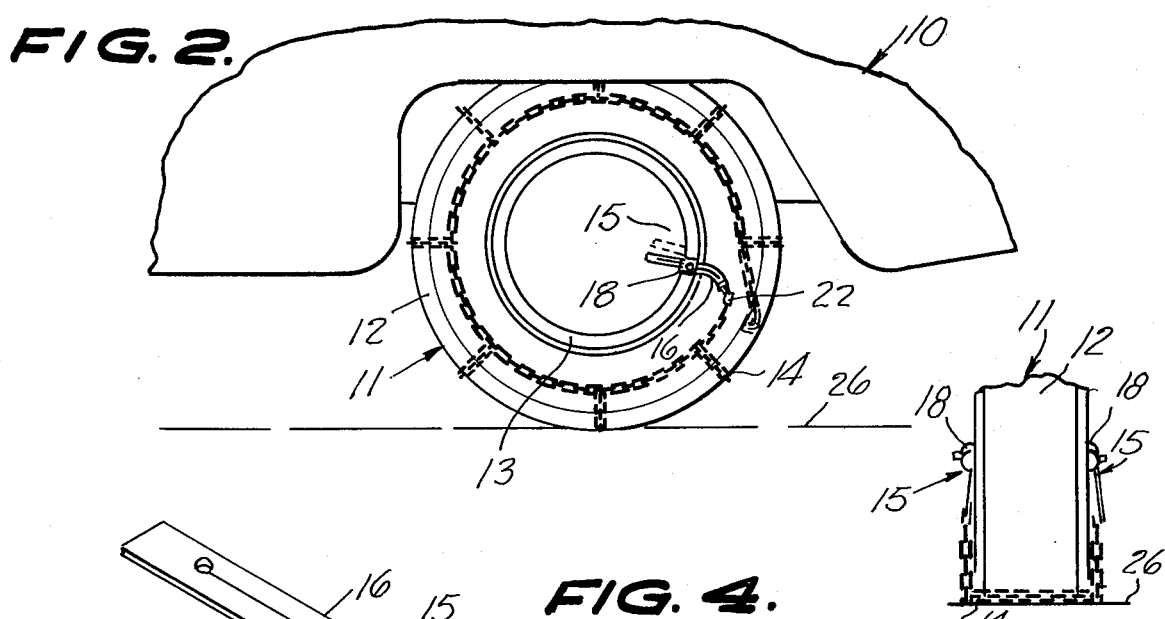
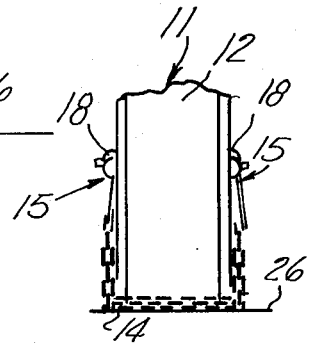
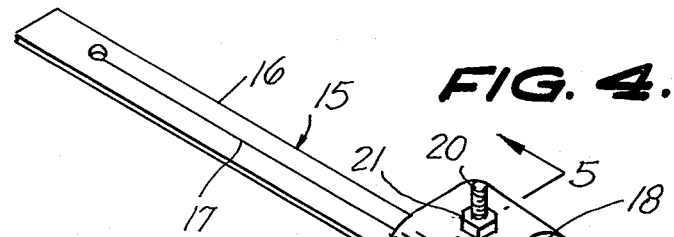
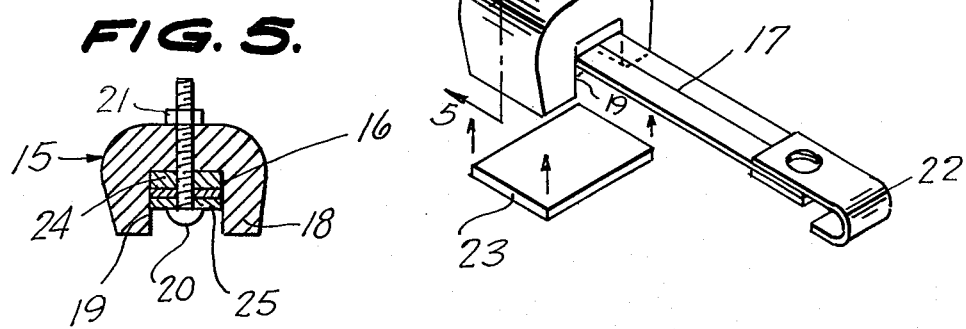

MAGNETIC TIRE CHAIN INSTALLING DEVICE

BACKGROUND OF THE INVENTION

1. Field of the Invention

The present invention relates to tire chain installing devices, and more particularly to a magnetic device that facilitates the installation of tire chains on vehicle wheels.

2. Summary of the Invention

A magnetic tire chain installing device is provided to permits a vehicle driver to get the chains on, over and around his rear vehicle wheels with a minimum amount of effort or struggle. With the present invention the operator initially straightens the chain out, and lays the chain on the ground behind the wheel. He then places the hook portion of the device onto the first link of the chain, using one device on the outside and one on the inside of the wheel. A keeper can then be removed from the magnets and the magnets can be placed on the rim. A screw member is provided which permits the strap portion of the device to be adjusted and after an operator has adjusted the device to his particular wheel size or requirements, they do not need to be readjusted. After both ends of the chains are secured together in the usual manner the magnetic installing device can be removed so then the driver can proceed on his way.

The primary object of the invention is to provide a magnetic tire chain installing device that permits the driver to put chains on, over and around his rear vehicle wheels with a minimum amount of effort and in the most advantageous and expeditious manner.

Another object of the invention is to provide a magnetic tire chain installing device that is rugged in structure and is simple and inexpensive to manufacture.

Other objects and advantages will become apparent in the following specification when considered in light of the attached drawings.

BRIEF DESCRIPTION OF THE DRAWINGS

FIG. 1 is a elevational view illustrating the first step in using the magnetic tire chain installing device of the present invention;

FIG. 2 is a elevational view illustrating a further step when using the present invention;

FIG. 3 is a sectional view, taken on the line 3—3 of FIG. 1;

FIG. 4 is a perspective view illustrating the magnetic tire chain installing device of the present invention; and FIG. 5 is a sectional view, taken on the line 5—5 of FIG. 4.

DESCRIPTION OF THE PREFERRED EMBODIMENT

Referring now to the drawings in detail, wherein like reference characters indicate like parts throughout the several figures, the reference numeral 10 indicates a portion of a vehicle such as an automobile having the usual rear wheels 11, and the wheels 11 include a tire 12 and usual rim 13 of magnetically susceptable material. The numeral 14 indicates a chain that is to be installed or mounted on a wheel such as the wheel 11.

In accordance with the present invention a magnetic tire chain installing device is provided that is indicated generally by the numeral 15, FIG. 4. The device 15 consists of a strap 16 that has an elongated slot or slit 17 therein for the purpose to be later described.

The numeral 18 indicates a magnet that has a recessed portion 19 for receiving the strap 16, FIG. 5. Numeral 20 indicates a securing element such as a bolt or screw member that extends through the slot 17 and through a suitable opening in the magnet 18, and a fastener or nut 21 may be arranged for threaded engagement with the threaded portion of the bolt 20.

Numeral 22 indicates a hook member that is suitably secured to the end of the straps 16. As shown in FIG. 4 a cover member or plate 23 may be selectively used with the magnet 18. The numeral 24 in FIG. 5 indicates a spacer member, and the numeral 25 indicates a washer or the like that can be mounted on the securing element 20.

Numeral 26 indicates the ground surface in FIGS. 1 and 2.

From the foregoing it can be seen that there has been provided a magnetic tire chain installing device, and in use with the parts arranged as shown in the drawings, a pair of the devices 15 of the present invention can be arranged as shown so that with the parts initially in the position of FIG. 1 the hook members 22 can engage the links of the chains 14, and the magnets 18 will adhere to the metal rim 13 of the vehicle wheel due to the magnetic attraction. Then, the vehicle can be moved forwardly so as to cause the chains 14 to be applied to the wheel, and after the chains 14 have been moved from a position such as that shown in FIG. 1 to a position such as that shown in FIG. 2, the devices 15 can be removed.

The parts can be made of any suitable material and in different shapes or sizes as desired or required.

It will therefore be seen that there has been provided a magnetic tire chain installing device whereby a driver can get the chains on, over and around his rear vehicle wheels with limited effort and struggle.

As shown in the drawings and in particular as shown in FIG. 1 initially the operator straightens the chain 14 out along the surface 26 so that the chain is laid out on the ground 26 behind the wheel 11. He then places the hook portion 22 of the device onto the first link of the chain 14, it being understood that one device is used on the outside and one on the inside of the wheel as for example as shown in FIG. 3.

The operator then removes the keeper 23 from the magnets 18 and places the magnets on the rim 13. It will be noted that a screw 20 is provided in the top portion of the magnet 18 which permits the strap portion to be adjusted due to the provision of the slot 17 in the strap 16. Once the operator adjusts the strap to his particular wheel size or requirments, they do not need to be adjusted.

After attaching as above described, the operator merely drives forward which carries the chain upward and around the tire to a position such as that shown in FIG. 2. Then, the operator secures both ends of the chain together in the usual manner, after first removing the magnetic installing devices 15 so that the driver can then proceed on his or her way.

Having thus described the preferred embodiment of the invention it should be understood that numerous structural modifications and adaptations may be resorted to without departing from the spirit of the invention.

What is claimed is:

1. A magnetic tire chain installing device, in combination with a wheel having a rim of magnetically susceptable material, an adjustable strap having a hook on one end for engaging a portion of a chain, a magnet having a recessed portion receiving said strap and a portion for engaging said rim, and a securing element in said accessed portion adjustably connecting said strap and magnet together.

2. A device as claimed in claim 1 wherein said strap has an elongated slot therein for the projection therethrough of the securing element and for adjusting the length of the strap according to the size of the wheel and tire.

3. A device as claimed in claim 1 and further including a cover plate detachably connected to said magnet for protecting the poles of the magnet until the magnetic tire chain is put in use.

4. A device as claimed in claim 1 wherein a pair of magnetic tire chain installing devices are provided so that one of the devices magnetically engages the outer surface of the vehicle rim of the wheel, while the other device magnetically engages the inner surface of the rim of a vehicle wheel.

* * * * *